March 18, 1947.  J. N. DITZLER ET AL  2,417,636
ENGINE HEATING COVER SYSTEM
Filed Feb. 8, 1943  2 Sheets-Sheet 1
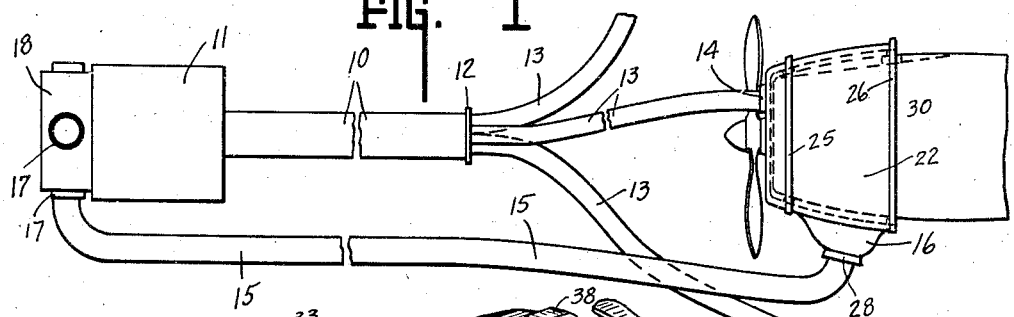
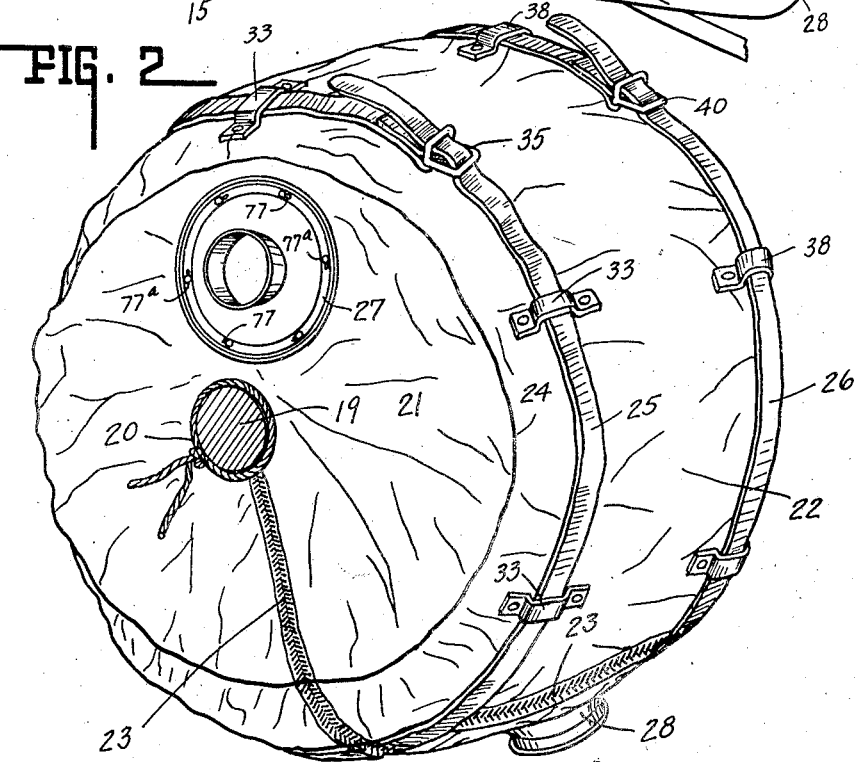
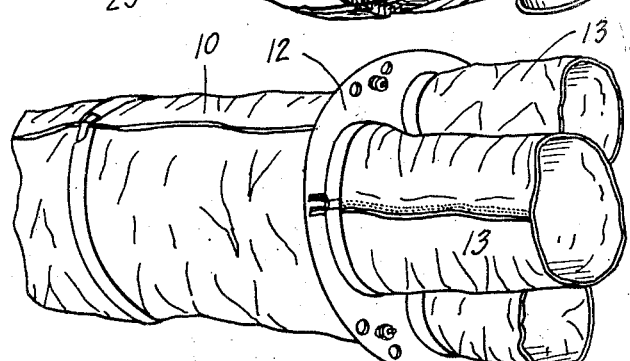
INVENTORS.
JOHN N. DITZLER.
CAROL OBERDORFER.
HENRY D. OBERDORFER.
BY Lockwood, Goldsmith & Galt.
ATTORNEYS.

March 18, 1947.   J. N. DITZLER ET AL   2,417,636
ENGINE HEATING COVER SYSTEM
Filed Feb. 8, 1943   2 Sheets-Sheet 2
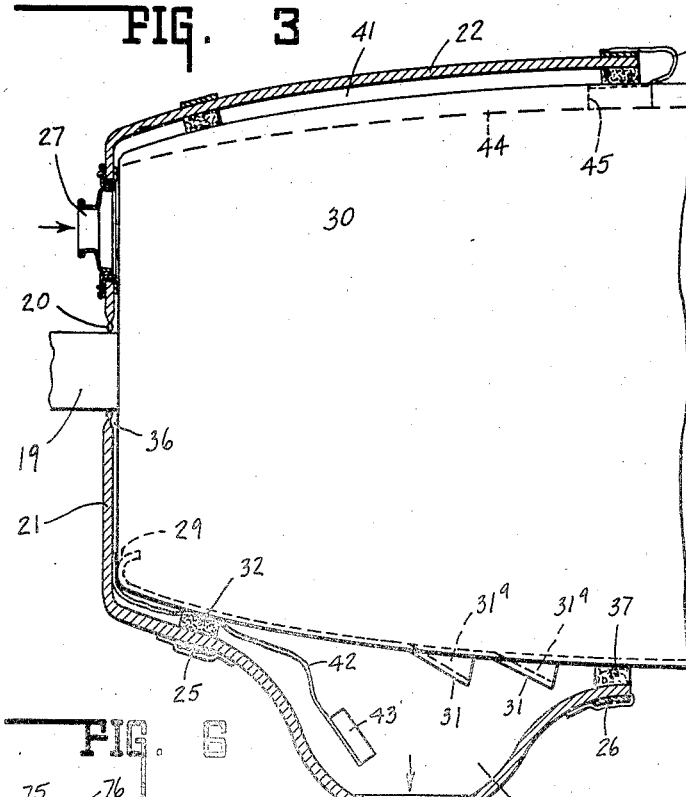
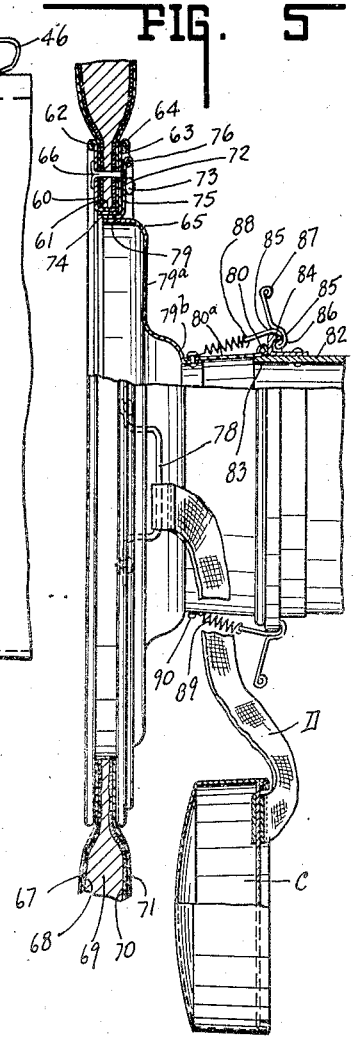
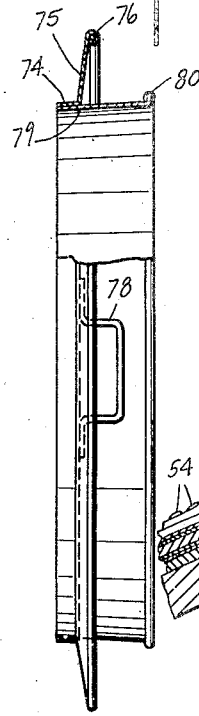
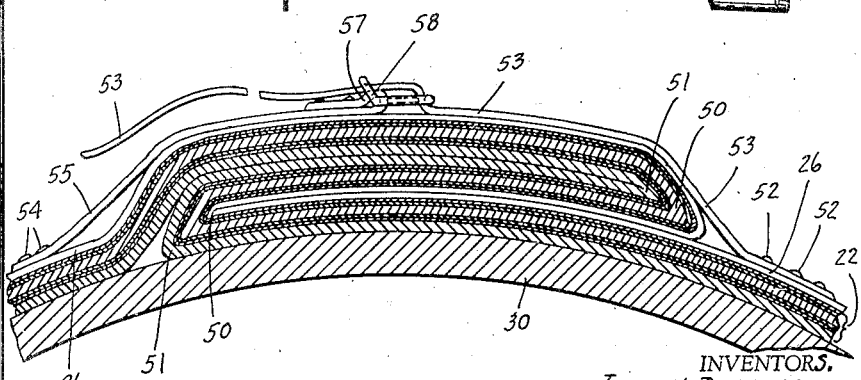
INVENTORS.
JOHN N. DITZLER.
CAROL OBERDORFER.
HENRY D. OBERDORFER.
BY Lockwood, Goldsmith & Galt,
ATTORNEYS.

Patented Mar. 18, 1947

2,417,636

UNITED STATES PATENT OFFICE 2,417,636

ENGINE HEATING COVER SYSTEM

John N. Ditzler, Silver Spring, Md., Carol Oberdorfer, Birmingham, Ala., and Henry D. Oberdorfer, New Castle, Ind., assignors to New Castle Products, New Castle, Ind., a partnership composed of Henry D. Oberdorfer and Julia S. Oberdorfer Application February 8, 1943, Serial No. 475,233

10 Claims. (Cl. 126—99)

This invention relates to an engine heating system and more particularly a heating cover therefor.

In certain localities the temperature is such that airplane engines, particularly for defense and offense, require heating so as to ready for action (operation). Heated hangars are usually not available for outpost patrol and fighter commands. The present invention is capable of twofold use; first it can be applied to a warm engine of a plane when it returns to a station to keep the engine thereof warm, or second, it can be applied to a cold engine to warm it up, and then keep it warm and ready for instant use, whether the engine came in warm or was initially cold, respectively. Even with heated hangars (usually 65° to 80° F.) the invention will materially reduce the warm up interval and can always maintain one or more planes in such a hangar ready for instant use.

The present invention permits recirculation of heated air derived from a "blitz" heater if the engine cover herein disclosed be suitably connected to such a heater. This connection increases the rapidity of engine heating. It also reduces the actual operating cost because initially raw air usually is at a temperature far below the previously heated air which, air discharge from between the heating engine and cover, is quite warm.

In addition to the aforesaid the present invention is directed to a cover structure that need only—at present writing—be made in a comparatively few sizes, so that same can accommodate a full range of engine sizes and types.

The chief object of the present invention is to provide a cover for an airplane engine, which cover not only is capable of functioning as outlined hereinbefore, but which first can be rapidly and easily applied to an engine, second, can be easily adjusted to the specific engine, and, equally important for instant action, can be very quickly removed.

One chief feature of the present invention resides in providing an engine cover of insulated character which has all the characteristics before mentioned.

Another chief feature of the invention resides in the cover including an intake and outlet for the engine heating air and of the peculiar character as hereinafter set forth, so that recirculation is possible.

Other objects and features of this invention will be set forth more fully hereinafter.

The full nature of the invention will be more fully understood from the accompanying drawings and the following description and claims.

In the drawings:

Fig. 1 is a diagrammatic top plan view of a multiple engine return circulation heating system.

Fig. 1A is a perspective view of a connection between a main and branch ducts.

Fig. 2 is a perspective view of the insulated cover in position on an engine cowling, the propeller being cut away at the inner hub portion.

Fig. 3 is a vertical sectional view of the invention showing the cover in position on the cowling.

Fig. 4 is a partial, sectional view of the rear strap structure with its auxiliary strap.

Fig. 5 is a half section and half side elevation of a connection fixture embodied in the cover.

Fig. 6 is a somewhat similar view of a portion of a larger unit than that illustrated in Fig. 5 which is of reducing character.

In Figs. 1 and 1A of the drawings 10 indicates a main duct for heated air supply connected at one end to a "blitz" heater 11. A plate 12 at the opposite end of said duct mounts connections to which are secured the branch ducts 13, each of which with the main duct is of sufficient length to lead from the heater, etc., which is portable, to the engine to be heated. The opposite or engine end of each branch duct includes an attaching unit 14 to which further reference will be had.

From each engine, if desired, there may lead a return duct 15, having a similar unit 16 at the engine end. This duct discharges at 17 to the air intake portion 18 of the "blitz" heater 11. Such an arrangement provides for return or recirculation of the heating air when the cover shown in Figs. 1, 2 and 3 is utilized.

Such a heater includes an air fan or blower, an air heater which may be oil, gasoline or coal fired, or electrically heated, an air blower for combustion purposes and a motor of electrical or gasoline engine type for operating both blowers. No claim is made to the heater per se and same may assume any appropriate form and be of any desired size or capacity and may be portable or stationary as desired.

The cover may be said to be cup shaped in outline, having a large opening at one end and a small central opening at the opposite end, the latter having a drawstring arrangement 20 for tightly embracing hub 19 of the propeller between the engine and blades. The front of the cover is designated by 21 and the body by 22.

Since the propeller blades are not removed, the cover is parted at 23 and herein a zipper fastening is preferably provided, although any other well known connections such as hook-and-eye, button and buttonhole, snap and snap fastener, or cross-lacing may be utilized in lieu of the zipper.

To the exterior of portion 22, a slight distance back from the connection 24, is secured an outside strap arrangement 25. At the rear and open end of portion 22 is similarly secured an outside strap arrangement 26. In the front 21 there is provided an air inlet 27 and near the bottom of portion 22 there is provided an air outlet 28. These preferably are of the same size for fabrication standardization and same are illustrated in Figs. 3, 5 and 6.

Now, when a plane comes in and it is desired to maintain its temperature, so it can leave immediately, if necessary, etc., the insulated cover is dropped over the cowling like a blanket. Then the zipper 23 is closed and the drawstring 20 tightened and tied about the propeller shaft. Then the cover is pulled rearwardly along the cowling and the straps 25 and 26 (more especially the latter) are tightened down. Plugs are then applied to intake and outlet structures of the cover if the engine residual heat only is to be used for maintaining the engine in heated condition. When additional heat is required or a cold engine is to be heated up the intake structure 27 of the cover is connected to duct 13 and, if desired for recirculation, the outlet structure 28 is connected to return duct 15 and the "blitz" heater then operated.

Engine temperatures of 175° F. only are required.

Reference will now be had more particularly to Figs. 2 and 3, and especially the latter. Therein 30 indicates a conventional cowling having near its rearward end outwardly directed louvres or flaps 31 adjustable toward and away from openings 31a. Such louvres can never be closed, so air always can circulate through the cowling and about the cowling enclosed engine (not shown) and by entering at the inlet end 29 and escaping at 31a. The rear end of the cowling is closed by the engine or other parts not shown.

The cover front 21 includes the propeller hub embracing structure 20, as previously described. Interiorly of the cover and rearwardly of the front there is suitably secured the blocking band or strip 32, which when the cover is mounted bears upon the exterior of the cowling near the forward end thereof. Upon the opposite side of the cover there is secured, as by loops, etc., 33, a clamping strap 25 of appreciable width and having a suitable connection 35, so that after the cover is mounted, zippered and pulled back until band 32 engages the cowling, the strap 25 then can be tightened down to hold the front end of the cover in place, forming an intake chamber 36 in free communication with intake 27.

Secured to the rearward end of said cover and interiorly thereof is another blocking band 37 and similarly mounted at 38 is a corresponding clamping strap 26 having a tautening connection 40. Connections 35 and 40 are non-slip buckles that can easily be unfastened by a man wearing heavy gloves.

Now, this end of the cover is mounted at the rear end of the cowling so that heated air supplied at 27 to chamber 36 can only pass into the cowling at 29 for the tie 20 about the propeller hub, see Fig. 2, closes the only other possible outlet.

The heated air after passing through the cowling and thus heating the engine, discharges from openings 31a into chamber 41. The lower end of this chamber is enlarged as at 42 and, see Fig. 2, mounts the outlet 28. Hence, the heated air after heating the engine can discharge at 28 and be recirculated if desired as previously described. Note that it is not objectionable to vary the spacing between blocking bands, hence a cover long enough for the longest cowling can be used equally as well on the shortest cowling, as well as all intermediate length cowlings.

Suitably secured to the interior of the cover by straps 42 are plugs 43 of felt and the like for the intakes of oil cooling air ducts conventional to certain airplane engines. When the cowling is dished or grooved as at 44 to provide clearance for a machine gun, the felted plug or block 45 connected to the cover by strap 46 can be dropped into said groove and then same is closed off. The plug in this instance is held in place by the rear band block 37 bearing thereon. In the case of the blocks to seal the oil cooling air passages, the blocks are pressure fitted for installation and removed by pulling on the connected straps when the cover is removed.

The cover is of insulated character and the several plugs mentioned naturally are of suitable material, usually similar to that of the cover, but may be of any other material suitable for the purpose. The cover is intended to heat an engine to about 175° F. from as low as 40 to 50 degrees below zero.

The cover includes an outer envelope and an inner envelope of duck with an intermediate layer of insulation, preferably about 1" in thickness, commonly called "dry zero." This quilt of "dry zero" is two layers of muslin between which is blown flame-proofed kapok or ceba fibre and this quilt or blanket is preferably quilted on 3" centers. The space between the two envelopes is completely filled with this blanket and the two in turn suitably secured together.

The method of longitudinally adjusting the cover to various length cowlings has been described. The method for adjusting for different cowling widths, or rather diameters, is different. In Fig. 4 there is illustrated a section of the cover 22 twice folded upon itself as at 50 at the blocking band or strap 37, the latter being folded as at 51. To the strap 26 at 52 is secured one end of an auxiliary strap structure 53. At 54 is secured another end of said auxiliary strap structure 55. These two structures when extended have a length at least equal to the length of the webbing strap 26 between anchorages 52 and 54. They may be adjusted, however, to any lesser length, that is to that length such that the two anchorages abut each other for example. A tautening connection 57—58 is included between portions 53 and 55. In this manner the diameter of the cover can be readily adjusted.

Reference will now be had to Fig. 5 wherein there is illustrated in detail the preferred construction of the intake and outlet structures. In said figure, 60 indicates a flat ring portion having on the inner periphery a forwardly directed sleeve or tubular projection 61. The outer edge includes a curled or beaded edge 62.

A similar ring unit includes the flat ring portion 63, with the outer bead 64 and the inner tube or sleeve 65 which telescopes within tube 61. Split rivets 66 secure said rings together and extend through the inner envelope 67, the inner muslin 68, the filler 69, the outer muslin 70 and the outer envelope 71 of the cover structure.

The outer ring includes a plurality of forwardly projecting, equally spaced, pins 72 having enlarged heads 73 spaced from the ring. Both intake and outlet structures are identical.

A tubular portion 74 includes an outwardly directed flange 75 with a beaded edge 76. This flange has keyhole slots 77, see Fig. 2, and one or more handles 78, see Figs. 5 and 6. When the larger portions 77a of the slots 77 are placed over the heads 73 and the structure rotated through handle 78, the necks of the pins 72 seat in slots 77 and the structure is locked to the inlet or outlet.

Secured to and rigid with tubular portion 74 that nests in the sleeve opening in the cover is a tubular portion 79 with reducer portions 79a and 79b and another tubular portion 80a that has an outer beaded edge 80.

Note that in Fig. 6 a large size unit is illustrated while in Fig. 5 a reducer type of unit is illustrated. In the latter the portion 80a thereof is of a diameter to nest a conventional five or ten gallon milk can cover C secured to the reducer by strap D on handle 78. This forms a plug for either reduced outlet or inlet or both and same can be applied quickly to the latter when forced circulation is not desired, but only heat retention is desired.

The duct 82 terminates in a tubular end 83 and an outwardly directed flange 84 adjacent that end and which is turned rearwardly. Flange 84 bears against bead 80 when the tube end 83 is nested or telescoped within tube 80a, see Fig. 5.

A plurality of hooks have the curved portions 85, the hook ends 86, the hand engageable ends 87 and the ends 88 to each of which is permanently secured one end of a spring 89 anchored at its opposite end as at 90 to the exterior of tube 81.

When the duct and reducer are telescoped and seated "home," the hooks are engaged so that ends 86 will engage over and grip the bead 85, so that by means of springs 89 the two are yieldingly locked together. Same may be quickly released by pulling on handles 87 and releasing the hooks 86 and then separating the duct from the reducer.

It is also pointed out that the shape of the reducer type unit shown in Fig. 5 is one that reduces turbulence. Turbulence means pipe friction, or a tendency to resist the flow of air. Thus, with small supply and discharge ducts the matter of air flow resistance into and out of the cover is of minimum character when the reducing unit illustrated in Figs. 2 and 5 are utilized.

When the larger unit is used, see Fig. 6, the same is similarly provided with hooks and adapted to telescopically receive a similar but larger end of a larger duct, not shown.

The diameter reducing auxiliary strap 53—55, see Fig. 4, may be applied to the forward strap, or two may be used.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. An engine cover including a heat insulating body portion of blanket type including a longitudinal parting, means securing the cover together at the parting to form a tubular blanket closed at its forward end, a peripheral sealing strip interiorly of and near the forward and closed end of the cover, a similar strip near the rearward end thereof, exterior strap means in juxtaposition to each of said strips for securing the cover in position upon an engine cowling and causing the strips to engage same, the cover having an opening forwardly of the forward strip and another opening intermediate the strips, the cover having a central opening at its forward closed end, and means adapted to close said central opening about a propeller or like shaft, the forward sealing strip requiring air to traverse through the interior of the cowling when circulated between the forward and intermediate openings.

2. An engine cover as defined by claim 1 characterized by the addition of an initial size adjusting auxiliary strap means for reducing a large size cover to adapt it to fit tightly upon a smaller size cowling.

3. An engine cover as defined by claim 1 characterized by the addition of an initial size adjusting auxiliary strap means for reducing a large size cover to adapt it to fit tightly upon a smaller size cowling, said adjusting strap means being secured at opposite ends to one of the other strap means.

4. An engine cover as defined by claim 1 characterized by the addition of an initial size adjusting auxiliary strap means for reducing a large size cover to adapt it to fit tightly upon a smaller size cowling, said adjusting strap means being secured at opposite ends to the rearmost strap means.

5. A cover as defined by claim 1 characterized by the addition of a plug for an air cooling duct in the cowl for oil cooling purposes and a strap secured at opposite ends to the plug and forward portion of the cover and interiorly thereof respectively.

6. A cover as defined by claim 1 characterized by the addition of a pad seatable in and conformable to a cowling groove, and a strap secured at one end to the pad and at the other end to the rear portion of the cover, said pad being adapted to be positioned in the groove in registration with the rearward blocking strip and retained thereby for air blocking purposes.

7. A readily removable heating jacket adapted for enveloping application to a side louvered, centrally apertured engine cowl, means on the jacket fore and aft thereof and adapted for peripheral association with the cowl to form an enveloping chamber thereabout, which jacket is provided with a means forming a hot air inlet adapted for connection with a hot air supply duct, said chamber being adapted to extend over a substantial area of the outer surface of the cowl when the jacket is placed thereon, the inlet being adapted to communicate with the cowl central aperture, means within the jacket preventing direct communication between the jacket inlet and the chamber when the jacket is cowl mounted, the chamber being adapted to communicate with the inlet only through the louvered cowl when the jacket is mounted thereon, and means forming an outlet from the chamber.

8. A readily removable heating jacket adapted for enveloping application to a side louvered, centrally apertured engine cowl, means on the jacket fore and aft thereof and adapted for peripheral association with the cowl to form an enveloping chamber thereabout, means forming a hot air inlet adapted for connection with a supply duct and juxtapositioned to the head end of the cowl when the jacket is mounted thereon, the chamber having a wall portion adapted to be spaced from the outer surface of the cowl when the jacket is properly positioned thereon whereby said chamber is adapted to peripherally envelope a substantial area of the cowl, means preventing direct communication between the chamber and the jacket inlet, when the jacket is cowl mounted, the chamber and inlet being adapted to communicate only through the cowl when the jacket is mounted thereon, and means forming an outlet from the chamber.

9. A readily removable heating jacket adapted for enveloping application to a side louvered, centrally apertured engine cowl, means on the jacket fore and aft thereof and adapted for peripheral association with the cowl to form an enveloping chamber thereabout, means forming a hot air inlet adapted for connection with a hot air supply duct and juxtapositioned to the head end of the cowl when the jacket is mounted thereon, the jacket with said fore and aft means forming an air chamber adapted to extend circumferentially about the outer surface of the cowl when the jacket is placed in position thereon, means adapted to prevent direct communication between the jacket inlet and the chamber when the jacket is cowl mounted, the chamber being adapted for communication with the inlet only through the cowl when the jacket is cowl mounted, said chamber between said fore and aft means including an enlargement, and means in said enlargement forming a hot air outlet, the outlet, enlargement and chamber having free communication, circulation of air from the jacket inlet to the outlet requiring air passage through the cowl when the jacket is mounted thereon.

10. In a pre-heating system for a cowled engine a jacket adapted for quick placement about the cowl containing the engine to be heated, which jacket is adapted for quick removal from the cowl, said jacket including a wall portion adapted to peripherally envelope the cowl, means on the jacket fore and aft thereof adapted for peripheral association with the cowl to form the enveloping chamber thereabout, the jacket at its forward end including means forming a hot air inlet thereto and adapted for connection to a forced supply of hot air, means forming a hot air outlet from the chamber when the jacket is mounted upon the cowl, and means carried by the interior of the jacket adapted for cowl engagement and substantial peripheral envelopment thereof when the jacket is cowl mounted, this last mentioned peripheral engagement being positionable intermediate the usual cowl cold air intake and exhaust openings, said last mentioned means blocking off the jacket inlet from the chamber when the jacket is cowl mounted whereby the hot air supplied to the jacket inlet is required to pass through the intake opening in the cowl, entering the same at one side of the blocked off area and leaving the cowl at the other side of that area thereby insuring positive circulation of hot air through the inside of the cowl and past the engine.

JOHN N. DITZLER.
CAROL OBERDORFER.
HENRY D. OBERDORFER.

REFERENCES CITED

The following references are of record in the file of this patent:

UNITED STATES PATENTS

| Number | Name | Date |
|---|---|---|
| 2,015,982 | Witzel | Oct. 1, 1935 |
| 2,078,116 | Arndt | Apr. 20, 1937 |
| 1,862,114 | Gilly | June 7, 1932 |
| 2,295,177 | King | Sept. 8, 1942 |
| 1,392,522 | Pate | Oct. 4, 1921 |
| 332,371 | Adams | Dec. 15, 1885 |
| 1,240,133 | Goldberg | Sept. 11, 1917 |